(12) United States Patent
Cooper

(10) Patent No.: US 10,253,861 B2
(45) Date of Patent: Apr. 9, 2019

(54) TORQUE VECTORING UNIT

(71) Applicant: Dana Automotive Systems Group, LLC., Maumee, OH (US)

(72) Inventor: Kenneth E. Cooper, Toledo, OH (US)

(73) Assignee: Dana Automotive Systems, Group, LLC, Maumee, OH (US)

( * ) Notice: Subject to any disclaimer, the term of this patent is extended or adjusted under 35 U.S.C. 154(b) by 133 days.

(21) Appl. No.: 15/410,191

(22) Filed: Jan. 19, 2017

(65) Prior Publication Data
US 2017/0211676 A1 Jul. 27, 2017

Related U.S. Application Data

(60) Provisional application No. 62/281,436, filed on Jan. 12, 2016.

(51) Int. Cl.
*F16H 48/36* (2012.01)
*F16H 3/04* (2006.01)

(52) U.S. Cl.
CPC ............. *F16H 48/36* (2013.01); *F16H 3/04* (2013.01); *F16H 2048/366* (2013.01); *F16H 2048/368* (2013.01)

(58) Field of Classification Search
CPC .... F16H 48/36; F16H 2048/368; F16H 57/08; F16H 48/06
See application file for complete search history.

(56) References Cited

U.S. PATENT DOCUMENTS

| 5,106,349 | A | 4/1992 | Botterill et al. |
| 5,234,072 | A * | 8/1993 | Chludek ............ B60K 17/3465 180/248 |
| 5,400,671 | A | 3/1995 | Hall et al. |
| 6,056,660 | A | 5/2000 | Mimura |
| 6,120,407 | A | 9/2000 | Mimura |
| 6,460,677 | B1 | 10/2002 | Roscoe |
| 7,044,880 | B2 | 5/2006 | Bowen |
| 7,552,660 | B2 | 6/2009 | Ginder |
| 8,506,439 | B2 | 8/2013 | Strasser et al. |
| 2010/0004088 | A1* | 1/2010 | Wenthen ............... F16H 37/046 475/204 |
| 2010/0219034 | A1 | 9/2010 | Wheals et al. |
| 2014/0287866 | A1* | 9/2014 | Sugino .................... F16H 57/08 475/269 |

\* cited by examiner

*Primary Examiner* — Mark J Beauchaine
(74) *Attorney, Agent, or Firm* — Marshall & Melhorn, LLC

(57) ABSTRACT

A torque vectoring unit for use with a motor vehicle including a differential unit, a gear arrangement and a clutch system. The gear arrangement is connected to the differential unit and includes a first gear set, a second gear set, a third gear set and a common shaft. The clutch system is selectively connected to the gear arrangement and includes a concentric inner clutch and a concentric outer clutch drivingly to an actuator. The actuator actuates each clutch independently. The first gear set includes an external gear supported on the common shaft and an internal gear selectively in engagement with the outer clutch. The second gear set includes an external gear supported on the common shaft and an internal gear selectively in engagement with the inner clutch. The third gear set includes an external gear coupled to the common shaft and an internal gear coupled to a differential case.

12 Claims, 1 Drawing Sheet

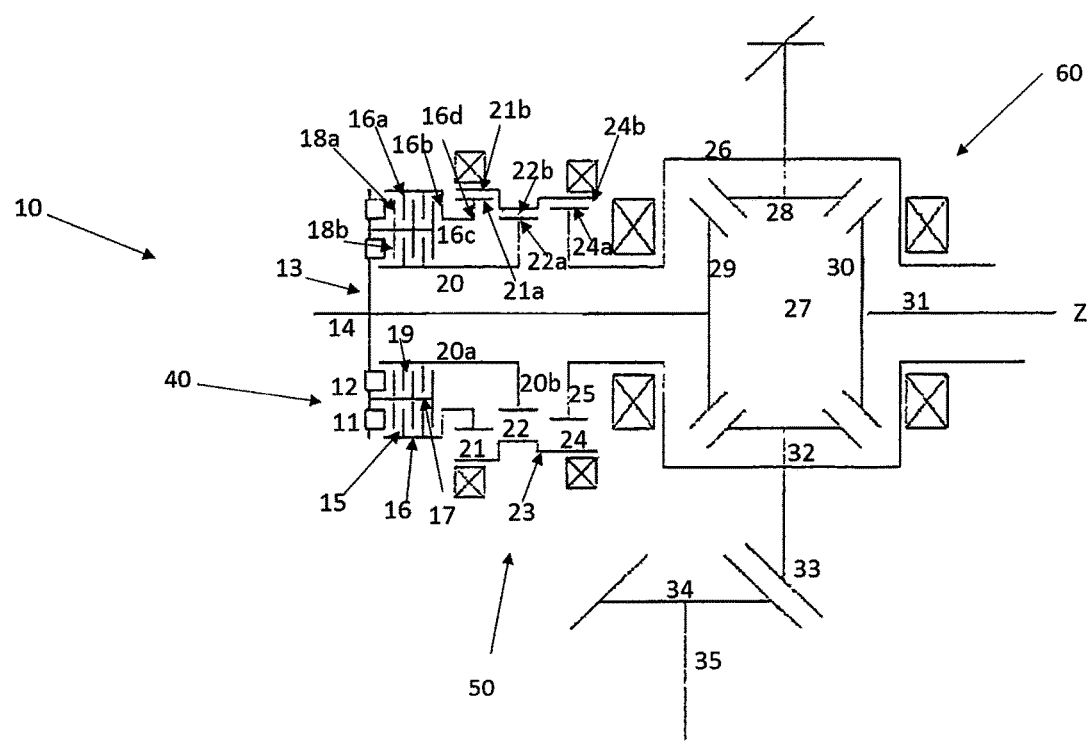

TORQUE VECTORING UNIT

RELATED APPLICATION

This application claims the benefit of U.S. Provisional Application No. 62/281,436 filed on Jan. 21, 2016, which is herein incorporated by reference.

FIELD

The present disclosure relates to a torque vectoring unit. More particularly, to a torque vectoring unit including a differential unit, a clutch system with concentric clutches having a common clutch plates and a gear arrangement.

BACKGROUND

Torque vectoring units are used in motor vehicles to enhance vehicle agility and stability in addition to improve mobility. Torque vectoring units allow motor vehicles to distribute drive torque unevenly to different wheels in order to enhance driving dynamics and stability. Various methods exist for distributing torque between two shafts of a motor vehicle. Torque vectoring units may be used in two-wheel and all-wheel drive vehicles. Torque vectoring units can used to distribute torque between two half axles of a vehicle or between front and rear drive shafts.

The torque vectoring market is limited by the traditional cost of such systems. The cost of the mechanical components making up the torque vectoring system is high due to the complex mechanical arrangements of the components. Therefore, there remains a need for a low cost torque vectoring system to be used in motor vehicle markets which require lower cost options.

SUMMARY

Provided herein is a torque vectoring unit for use with a motor vehicle including a differential unit, a gear arrangement and a clutch system. The differential unit includes a differential gear arrangement housed in a differential case. The gear arrangement is drivingly connected to the differential unit and includes a first gear set, a second gear set, a third gear set and a common shaft. The differential gear arrangement is drivingly connected to two output shafts. The clutch system is selectively drivingly connected to the gear arrangement and includes a concentric inner clutch and a concentric outer clutch drivingly connected to a first output shaft and an actuator. The actuator is connected to the two concentric clutches and actuates each clutch independently. The first gear set includes an external gear rotatably supported on the common shaft and an internal gear selectively in drivingly engagement with the outer clutch. The second gear set includes an external gear rotatably supported on the common shaft and an internal gear selectively in driving engagement with the inner clutch and the third gear set includes an external gear rotatably coupled to the common shaft and an internal gear rotatably coupled to the differential case.

BRIEF DESCRIPTION OF THE DRAWINGS

The above, as well as other advantages of the present disclosure, will become readily apparent to those skilled in the art from the following detailed description when considered in the light of the accompanying drawings in which:

FIG. 1 is a schematic view of the torque vectoring unit in accordance with a preferred embodiment.

DETAILED DESCRIPTION OF THE DRAWINGS

It is to be understood that the present disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Referring now to FIGURE, one preferred embodiment of a differential torque vectoring unit is provided 10. The torque vectoring unit 10 includes a differential unit 40, a gear arrangement 50 and a clutch system 60. The differential unit 40 is drivingly connected to the gear arrangement 50 and the clutch system 60.

The differential unit 40 includes a differential gear arrangement 27 having a ring gear 33 extending radially outward therefrom. The ring gear 33 is rotationally fixed to the differential case 26. The ring gear 33 may be integrally formed with the differential case 26 or it may be secured thereto with a plurality of fasteners. The differential case 26 is mounted on bearings 42, 44 to facilitate rotation.

The ring gear 33 is in constant mesh with a pinion gear 34 attached to an input shaft 35 via gear teeth (not shown) on the pinion gear 34 and ring gear 33. The teeth are complimentary to one another and provide rotational drive from the pinion gear 34 to the ring gear 33. The pinion gear 34 can be a helical or bevel gear or any other gear known to those skilled in the art. Power is supplied to the pinion gear 34 by the input shaft 35 powered by a rotational source of energy including, but not limited to, an engine of a motor vehicle (not shown) and other motor vehicle driveline components. It can be appreciated that the connection of the ring gear 33 and the differential case 26 results in rotation of the differential case 26 when the ring gear 33 is driving by the pinion gear 3.

As shown in FIG. 1, the differential gear arrangement 27 includes a set of pinion gears 28 and a set of side gears 29, 30 rotatably supported and positioned in the differential case 26. Other differential gear arrangements, i.e. planetary differential gear arrangement can also be used in the torque vectoring unit 10. The differential case 26 can rotate around a rotational axis Z along with two output shafts 14, 31 which are supported coaxially to the rotational axis Z. The side gears 29, 30 mesh with the pinion gears 28. The side gear 29 is drivably coupled to a first output shaft 14 and side gear 30 is drivably coupled to a second output shaft 31. In one embodiment, the output shafts 14, 31 are axle half shafts that lead to the wheel ends (not shown). However, in some embodiments, the output shafts 14, 31 and axle half shafts are separate entities drivingly connected to each other. The pinion gears 28 are rotatably supported on a pinion shaft 32 secured to the differential case 26.

The first output shaft 14 extends radially outward from the differential unit 40 towards the clutch system 60. The clutch system 60 includes two clutches 11, 12 drivingly connected to an intermediate shaft 13. Intermediate shaft 13 extends radially outward from the output shaft 14. In one embodiment, the clutches 11 and 12 are concentric clutches. Clutch 12 is positioned radially outward from output shaft 14 and is the radially inner clutch. Clutch 11 is positioned directly radially outward from clutch 12 and is the radially outer clutch. The intermediate shaft 13 extends radially from output shaft 14 and is connected to clutches 11, 12.

Clutch 11 is the radially outer clutch and includes a first set of clutch plates 15 which extend radially inward from a first clutch hub 16. Clutch hub 16 has a first axially extending portion 16a that extends parallel to the Z-axis away from the intermediate shaft 13, a first radially extending portion 16b that extends inward from the axially extending portion 16a, a second axially extending portion 16c that extends axially away from clutches 11, 12 on the end of portion 16b opposite 16a and a second radially extending portion 16d that extends radially outward from the end of portion 16c opposite 16b.

Clutch 11 includes a second clutch hub 17 which has a set of clutch plates 18 extending radially in both directions from the clutch hub 17. Clutch hub 17 is radially inward from the clutch hub 16. Clutch plates 18 are mounted for axial movement with respect to the clutch hub 17. Clutch plates 18 include a portion that extends radially outward 18a from the clutch hub 17 and a portion that extends radially inward 18b from the clutch hub 17. The first set of clutch plates 15 extend radially inward from portion 16a of the clutch hub 16 and interleave with the radially outward extending portion for the clutch plates 18a.

The first radially extending portion 16a of the clutch hub 15, the second clutch hub 17, the radially outward portion of clutch plates 18a, clutch plates 15 and shaft 13 form the outer clutch 11.

Clutch 12 includes the clutch hub 17 and the radially inward extending portion of clutch plates 18b. A third set of clutch plates 19 extend radially outward from a third clutch hub 20. Clutch hub 20 has an axially extending portion 20a that extends axially parallel to the Z-axis away from the intermediate shaft 13 and a radially extending portion 20b that extends radially outward from the end of portion 20a. Clutch plates 19 extend radially outward from the axially extending portion 20a of the third clutch hub 20 and interleave with the radially inward extending portion of the clutch plates 18b.

The radially extending portion 20a of the third clutch hub 20, the second clutch hub 17, the radially inward portion of clutch plates 18b, clutch plates 19 and shaft 13 form the inner clutch 12.

The clutch plates 15 and 18 form the clutch pack for the outer clutch 11 and clutch plates 18 and 19 form the clutch pack for the inner clutch 12. Thus, the clutches 11, 12 share a common set of clutch plate 18. Each of clutch pack can contain clutch plates known in the art. As shown in FIG. 1, clutches 11 and 12 include five clutch plates; however, it is understood that any number of plates may form the clutches 11, 12.

As shown in FIG. 1, clutches 11 and 12 are positioned radially adjacent to each other such that a single actuator mechanism (not shown) can actuate both clutches 11, 12. Therefore, only one clutch 11 or 12 is engaged at any instant time. The actuator mechanism can include an actuator, an additional gear set and a roller and ramp assembly. The actuator may be a reversible electric motor as it is compact and easily controllable. It will be appreciated that any other appropriate type of actuator and actuator mechanism may be used including hydraulic or pneumatic actuators.

The gear arrangement 50 includes a first gear set 21, a second gear set 22, a third gear set 24 and a common shaft 23. The gear arrangement 50 is selectively drivingly connected to the clutch system 60 and the differential unit 40.

The second radially extending portion 16d of the first clutch hub 16 has a gear 21a rotatably supported on the end thereof. Gear 21a is an internal gear that meshes with an external gear 21b. Gears 21a, 21b form the first gear set 21. The external gear 21b is rotatably supported on the common shaft 23. Gears 21a, and 21b have teeth thereon that are complimentary to one another and provide rotational drive from the external gear 21b and the internal gear 21a.

The radially extending portion 20b of third clutch hub 20 has an internal gear 22a rotatably supported on the end thereof. Gear 22a is an internal gear that meshes with an external gear 22b. Gears 22a, 22b form the second gear set 22. The external gear 22b is rotatably supported on the common shaft 23. External gears 22b and 21b can be rotated independently of one another. Gears 22a, 22b have teeth thereon that are complimentary to one another and provide rotational drive from the external gear 22b and the internal gear 22a. Gear set 22 is axially adjacent to gear set 21. The common shaft 23 is radially outward from output shaft 14.

The third gear set 24 includes an internal gear 24a and external gear 24b. Gears 24a, 24b have teeth thereon that are complimentary to one another and provide rotational drive from the external gear 24b and the internal gear 24a. External gears 21b, 22b and 24b are supported on the common shaft 23 and can be rotated independently of each other.

The third gear set 24 is axially adjacent to the second gear set 22. Internal gear 24a is rotatably attached on the end of a radially extending flange 25. The flange 25 extends from the differential case 26 which houses the differential gear arrangement 27. Thus, the third gear set 24 is drivingly connected to the differential case 28. The differential case 26 extends axially away from the differential gear arrangement 27 parallel to the output shaft 14 toward the clutches 11, 12.

In some embodiments, the position of gear sets 22 and 24 may vary such that gear set 24 is adjacent to gear set 21 and between gear sets 21 and 22. The first gear set 21 has a given center distance, the second gear set 22 has a given center distance and the third gear set 24 has a given center distance. In some embodiments, the first and second gear sets 21, 22 have the same center distance with a high gear reduction ratio. Further, in some embodiments, the first and third gear sets 21, 24 have the same center distance with a low gear reduction ratio. Many choices of gear combinations, giving a wide range of speed ratios, are possible without changing this common center distance. The size and number of teeth on each gear establishes the gear ratios. The number of teeth on gear sets 21, 22 and 24 can be in ratios of 42×57, 29×44, 74×89, respectively. Another example is 43×57, 30×44, 75×89. Additionally 44×47, 31×44, 76×89. A large number of possible tooth counts can be used allowing for a wide choice of gear ratios to meet vehicle packaging constraints.

The number of teeth also determines the maximum wheel to differential over speed ratio. For example, over speed ratios of 11.8%, 10.6% and 9.6% respectively can be achieved using the above tooth counts. A large number of possible tooth counts can be used providing a wide choice of over speed ratios to meet various vehicle constraints.

The actuator, and thus an operation of the torque vectoring unit 10 can be controlled by an electronic control unit (not shown) Based on an evaluation of conditions according to at least one vehicle parameter, such as but not limited to, wheel speeds, the electronic control unit engages the actuator to selectively engage the clutches 11, 12 to effectively transfer from the output shafts 14, 31.

It can be appreciated that the during operation of a motor vehicle, a wheel attached to output shaft 14 can rotate faster than a wheel attached to output shaft 31. By actuating the outer clutch 11, the first gear set 21 is drivingly connected to the common shaft 23. Torque can be forced to flow from the output shaft 14 through clutch 11 and gear sets 21 and 23 to the differential case 26. The differential case 26 is drivingly connected to the differential gear arrangement and can bias torque to the slower wheel attached to output shaft 31. By biasing torque to the slower wheel attached to output shaft 31, the torque vectoring unit 10 generates an understeer yaw moment. The difference in torque across the output shafts 14, 31 corresponds to the torque applied to the clutch 11.

Further, it can be appreciated that the during operation of a motor vehicle, a wheel attached to output shaft 14 can rotate faster than a wheel attached to output shaft 31. By actuating the inner clutch 12, the second gear set 22 is drivingly connected to the common shaft 23. Torque can be forced to flow from the third gear set 24 to the second gear set 22 and to the output shaft 14 through clutch 12. By biasing torque to the faster wheel attached to output shaft 14, the torque vectoring unit 10 generates an oversteer yaw moment.

Further, it can be appreciated that the during operation of a motor vehicle, a wheel attached to output shaft 14 can rotate slower than a wheel attached to output shaft 31. By actuating the inner clutch 12, the second gear set 22 is drivingly connected to the common shaft 23. Torque can be forced to flow from the third gear set 24 to the second gear set 22 and to the output shaft 14 through clutch 12. By biasing torque to the slower wheel attached to output shaft 14, the torque vectoring unit 10 generates an understeer yaw moment.

Further, it can be appreciated that the during operation of a motor vehicle, a wheel attached to output shaft 14 can rotate slower than a wheel attached to output shaft 31. By actuating the outer clutch 11, the first gear set 21 is drivingly connected to the common shaft 23. Torque can be forced to flow from the first gear set 21 to the third gear set 24 and o the differential case 26. The differential case 26 is drivingly connected to the differential gear arrangement and can bias torque to the faster wheel attached to output shaft 31. By biasing torque to the faster wheel attached to output shaft 31, the torque vectoring unit 10 generates an oversteer yaw moment.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A torque vectoring unit for use with a motor vehicle, comprising
    a differential unit including a differential gear arrangement housed in a differential case;
    a gear arrangement drivingly connected to the differential unit including a first gear set, a second gear set, a third gear set and a common shaft; and
    a clutch system selectively drivingly connected to the gear arrangement;
    wherein the differential gear arrangement is drivingly connected to two output shafts,
    wherein the clutch system includes a concentric inner clutch and a concentric outer clutch drivingly connected to a first output shaft and an actuator connected to the two concentric clutches that actuates each clutch independently,
    wherein the first gear set includes an external gear rotatably supported on the common shaft and an internal gear selectively in drivingly engagement with the outer clutch,
    wherein the second gear set includes an external gear rotatably supported on the common shaft and an internal gear selectively in driving engagement with the inner clutch, and
    wherein the third gear set includes an external gear rotatably coupled to the common shaft and an internal gear rotatably coupled to the differential case.

2. The torque vectoring unit of claim 1, wherein the differential case further includes a radially extending flange on which the internal gear of the third gear set is rotatably supported on.

3. The torque vectoring unit of claim 1, wherein the first gear set, the second gear set and the third gear set have a common center distance.

4. The torque vectoring unit of claim 1, wherein the second gear set has a higher gear ratio than the gear ratio of the third gear set.

5. The torque vectoring unit of claim 1, wherein the first gear set has a lower gear ratio than the gear ratio of the third gear set.

6. The torque vectoring unit of claim 1, wherein the common shaft is radially outward from the output shafts.

7. The torque vectoring unit of claim 1, wherein the inner clutch and outer clutch have a common set of clutch plates.

8. The torque vectoring unit of claim 1, wherein the differential gear arrangement includes a set of side gears drivingly connected to the output shafts and a set of pinion gears drivingly connected to the differential case.

9. The torque vectoring unit of claim 1, wherein the external gear of the first gear set, the external gear of the second gear set, and the external gear of the third gear set can be rotated independently of each other.

10. The torque vectoring unit of claim 1, wherein the gearing arrangement is positioned axially between the clutch system and the differential unit.

11. The torque vectoring unit of claim 1, wherein the second gear set is axially between the first gear set and the third gear set.

12. A vehicle comprising the torque vectoring unit of claim 1 and at least a pair of output vehicle wheels wherein the output shafts are drivably connected to one of the said output vehicle wheels.

\* \* \* \* \*

UNITED STATES PATENT AND TRADEMARK OFFICE
CERTIFICATE OF CORRECTION

PATENT NO. : 10,253,861 B2  
APPLICATION NO. : 15/410191  
DATED : April 9, 2019  
INVENTOR(S) : Kenneth E. Cooper Page 1 of 1

It is certified that error appears in the above-identified patent and that said Letters Patent is hereby corrected as shown below:

On the Title Page

Related U.S. Application Data should read as follows:
(60) Provisional application No. 62/281,436, filed on January 21, 2016.

Signed and Sealed this
Twenty-eighth Day of April, 2020

Andrei Iancu
*Director of the United States Patent and Trademark Office*